March 18, 1930.    A. O. AUSTIN    1,750,771
CONDENSER LIGHTNING PROTECTION DEVICE
Filed Aug. 11, 1924    2 Sheets-Sheet 2
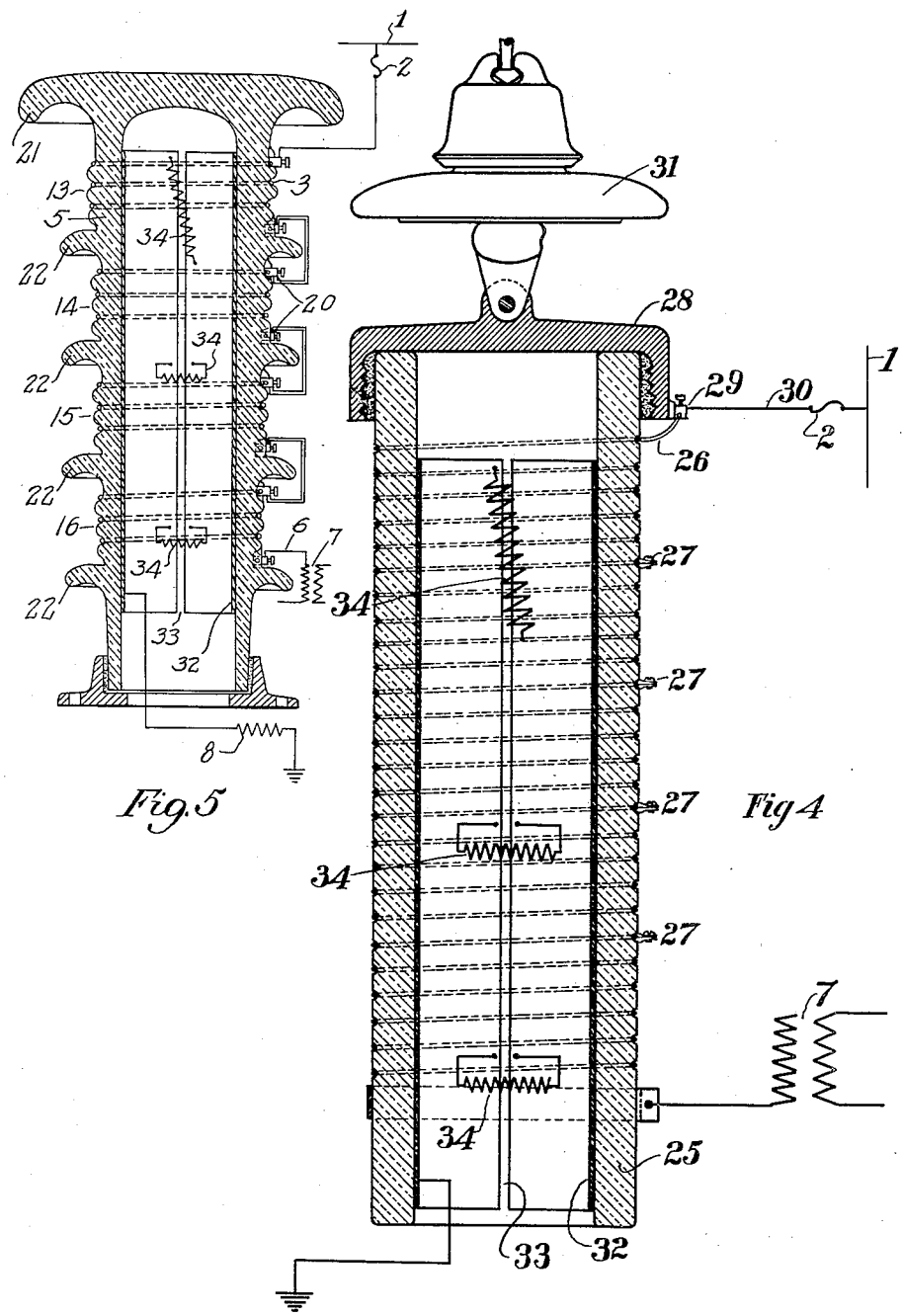

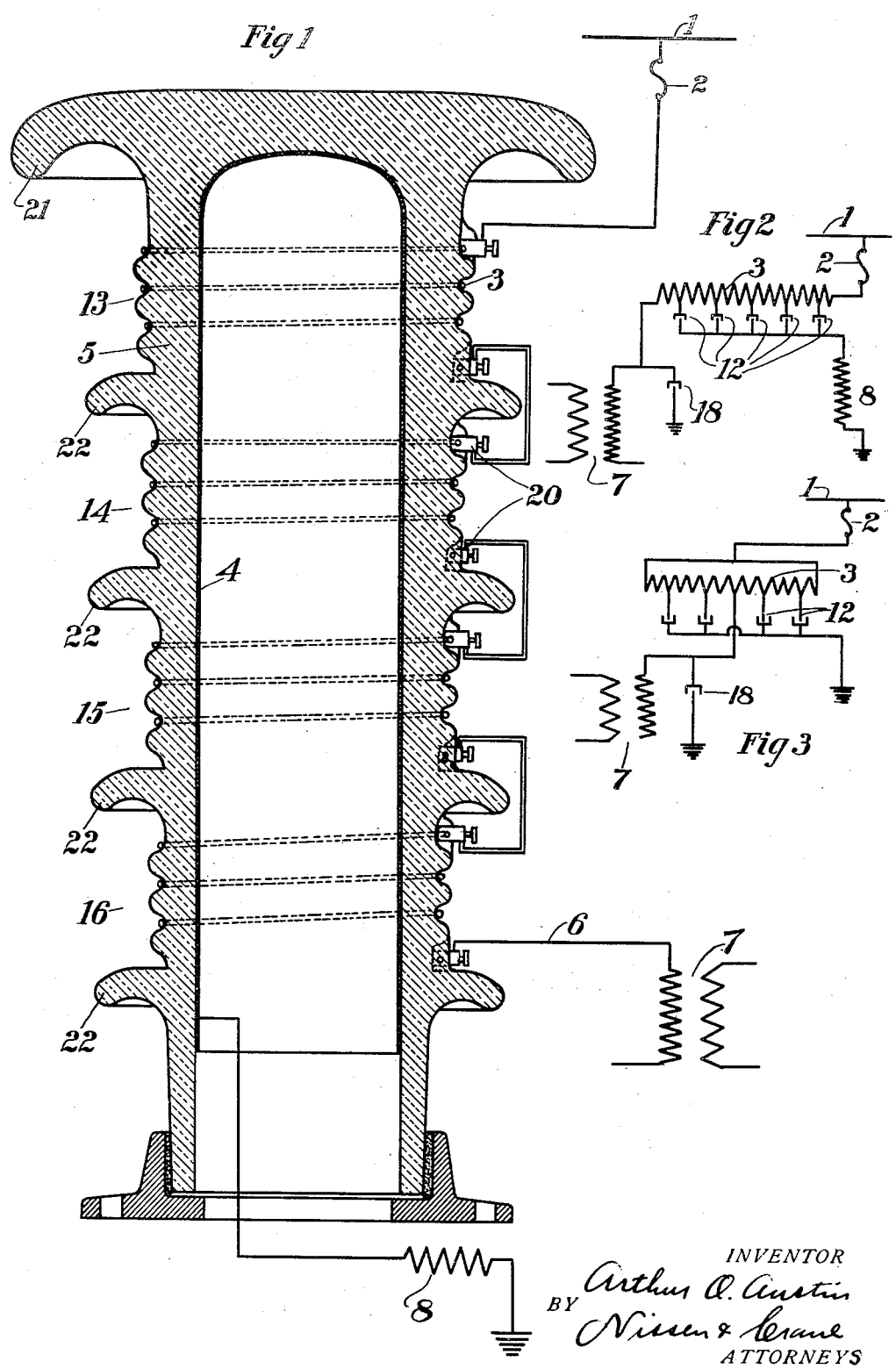

Patented Mar. 18, 1930

1,750,771

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CONDENSER LIGHTNING PROTECTION DEVICE

Application filed August 11, 1924. Serial No. 731,499.

This invention relates to devices for protecting apparatus from lightning or other disturbances which may be produced in a transmission line or system. It has for its object the provision of protection devices of the class named, which shall be economical to manufacture, simple in structure and efficient in operation.

The invention is exemplified in the combination and arrangement of parts shown in the accompanying drawings and described in the following specification and it is more particularly pointed out in the appending claims.

In the drawings—

Fig. 1 is a sectional view showing one embodiment of the present invention.

Figs. 2 and 3 are circuit diagrams showing different arrangements of circuits in which the invention may be employed.

Fig. 4 is a view similar to Fig. 1 showing a modified form of the invention.

Fig. 5 is a sectional view similar to Fig. 1 showing the form of dielectric member of Fig. 1 equipped with the form of internal conductor member shown in Fig. 4.

In connecting up small transformers or electrical apparatus of small capacity, considerable difficulty is experienced in insuring a high degree of protection from lightning and other electrical surges, particularly if the apparatus is built for comparatively low working voltages. Lightning is just as severe on a low voltage line as on a high voltage line, the magnitude of voltage usually being limited only by the break-down in some point of the insulation, as low voltage lines are not insulated as highly as high voltage lines and surges on the apparatus are usually not so high. Owing to the relatively high voltage, however, of the surge compared to the operating voltage of the apparatus, it is practically impossible to provide the necessary insulation in the apparatus itself without excessive cost. It is, therefore, extremely important to provide lightning or surge protection for apparatus of small size.

The general principle is to connect a lightning arrester of some type in multiple with the apparatus. This frequently forms only partial protection as the time lag in the arrester or its inability to discharge heavy surges permits a serious rise of voltage in the apparatus which may destroy the apparatus.

In the improved protective apparatus, however, it is necessary for all current or voltage disturbances to pass through the protective apparatus, as the protective apparatus is placed between the line and the apparatus to be protected. In other words, the protective apparatus is in series with the device to be protected rather than in multiple with it. This is subject to the disadvantage that there is some small power loss in the protective apparatus. To offset this slight loss, a much higher degree of protection is obtained, a lower cost may be provided in the protective apparatus and a means is provided for damping out high frequency disturbances so that the apparatus will be subjected to such disturbances for the shortest period of time possible. In addition, the effect of time lag in the operation of the arrester is eliminated. As the arrester has no gap to form an arcing ground, it does not set up a surge on the system owing to striking of the arc across the gap.

By properly proportioning the resistance in the arrester to the apparatus, the power loss under normal operation may be reduced to a relatively small quantity and at the same time a comparatively small arrester will provide a large amount of protection.

One arrangement of the lightning arrester is shown in Fig. 1. Transmission line 1 is connected to the arrester by a fuse or circuit breaker 2. The arrester consists of a resistance winding 3 which forms an electrostatic condenser with the inner lining 4 of the arrester. The two conductors 3 and 4 are separated by a dielectric member 5 which has sufficient insulation to prevent break-down with the impressed voltage.

One end or a tap 6 of the resistance winding is connected to the transformer 7 or apparatus to be protected. The inner coating 4 of the condenser is connected to the ground directly or through a resistance 8. In general, the resistance 8 is not necessary, although there are cases where this resistance may be used to advantage in damping out oscillation. By using a resistance 8 in the ground lead, the condenser will withstand a higher surge without danger of failure. This tends to reduce its value as a protective means, but several units may be used in multiple to give the desired protection. In some cases it may be advisable to bunch a number of units together to provide a high degree of protection, and, at the same time permit use on large circuits where the normal power current is relatively large.

The arrangement of the condenser is better shown by a diagram in Fig. 2. The condenser connecting to one side of the power circuit only is shown, the connection to the other side being similar. The resistance 3 constituting one element of the condenser is connected to the line 1 by a fuse or circuit breaker 2. The resistance 3 may be wound inductively or non-inductively on the dielectric member 5. The diagram shows the resistance wound inductively and so as to form a condenser with the inner coating 4. A high frequency surge impressed on the line will cause current to flow over the inductive resistance 3. Part of this current will go through the condenser formed by the elements 3 and 4 and dielectric 5 and represented in Fig. 2 by the elements designated 12, the amount of current depending upon the voltage impressed and the frequency, as well as the capacitance of this section.

If the inductive resistance has the proper proportions, there will be a material drop in voltage. By using the resistance winding so that it will be non-inductive, any current flowing over the same will always insure a drop in voltage. For convenience, however, it is usually possible to wind the condenser with inductive resistance and so form the other electrode of the condenser that there will be a material absorption of energy due to the field set up by the inductive resistance.

Since there will be a flow of current into the various sections of the condenser 13, 14, 15 and 16, the amount of current will be the greatest in the resistance 3 on the line side and least on the transformer side. Since the flow of current over the resistance will produce a drop in voltage, the voltage on the section of the condenser 13 will be higher than on the section of the condenser 16. This is very desirable as it tends to increase the flow of current into the section of the condenser nearest the line without subjecting the transformer to this voltage. This is particularly advisable as the capacitance of the transformer to ground represented by 18 may be relatively small. The inner coating of the condenser may be connected to ground through resistance 8. This will limit the voltage which may be impressed upon the condenser, but will tend to damp out any oscillation between the protected apparatus and the condenser itself. For a given amount of protection, it will usually, however, be necessary to use more condenser units in multiple to form the same protection where the ground connection is used than where it is omitted.

The arrangement as shown has many advantages as it is possible to change the current capacity of the winding 3. Under high frequency disturbances, there is a very considerable flow of current. Since this flow of current will be greatest on the entering side, it will be possible to use a resistance having larger current carrying capacity on this end and reduce the current carrying capacity of the winding 11.

By grading the current capacity of the winding the condenser may be readily adjusted for different current capacities in the apparatus to be protected. By splitting the winding up into sections and bringing out leads 20, it is possible to use the sections of the winding in multiple or in series multiple or multiple series arrangements. It, of course, is necessary to provide sufficient insulation between the various sections so that flash-over will not occur between the different portions of the winding under surge conditions.

Since there is an appreciable drop in voltage along the winding, it is possible to take advantage of this by increasing the necessary dielectric strength in the condenser adjacent the line side to withstand the higher voltage and increase the capacitance of the condenser by thinning the wall where the stress is lowest. The thickness of the dielectric will be greatest on the line side of the winding and thinnest on the station or apparatus side. This grading in insulation gives maximum protection and tends to reduce the cost of the condenser for a given protection. It is evident that the line may be connected to each end of the outer winding and the transformer connected to the center as shown in Fig. 3. This will increase the current carrying capacity and reduce the power losses under normal operation. It will, of course, reduce the protection formed by the condenser, but as the size of the apparatus increases, the capacitance of same represented by 18 tends to increase.

It is evident that many similar arrangements may be used to vary the effective current carrying capacity or the resistance reactance of impedance in the winding. By using an inner lining 4 which has a rather low longitudinal resistance and a high lateral resistance, a considerable absorption of energy may take place due to short circuit currents set up under an oscillation. These short circuit currents may be controlled by punching out portions of the inner coating so as to control the path of the effective resistance or by the nature of the coating itself. In fact, electrical characteristics of the arrester may be controlled to a very large extent owing to the nature of this inner coating, as it may vary from a short circuit turn of very low resistance to one of infinite resistance where it is open.

Arresters of this type may be incorporated in the transformer cases themselves or be a part of the entrance bushings. In the latter case it is usually advisable to place the winding on the inside and the ground on the outside. Since this tends to increase the size of the bushing, however, it is usually advisable to use the condenser as a lightning arrester made up in separate pieces of equipment. In order to prevent flash-over between the two condenser surfaces, it is advisable to insert a sufficient length of leakage path or have insulation which will provide sufficient arcing voltage between and beyond the ends of the two condenser surfaces.

For out of door work it is usually advisable to provide the dielectric member with insulating flanges. These flanges are usually so constructed that they will act as water sheds and prevent flash-over between the two surfaces under rain. These flanges are preferably of insulating material although they may be made of metal providing there is sufficient insulation in the insulating body member 5.

In the form of the invention shown in Fig. 4, the dielectric member is shown as a straight tube 25 having a resistance winding 26 thereon, the winding being provided with spaced taps 27 at intervals thereon. A cap 28 is cemented to the top of the tube and provided with a terminal 29 for holding the upper end of the winding 26 and for securing it to the line wire 30. The entire device is supported by the cap 28 and may be hung from an insulator or string of insulators 31. The inner condenser element is shown as a cylindrical sheet of metal 32 secured to the inner face of the tube 25 and split longitudinally so that it does not form a closed path for induced currents. The gap 33 in the cylinder 32 is bridged by resistance elements 34 which may be given the requisite values to produce desired absorption of energy due to currents induced under oscillations in the outer windings. This resistance may be bridged directly across the gap or may be extended diagonally across as shown in the drawing.

In the form of the invention shown in Fig. 5, the dielectric member is graduated in thickness in the manner of Fig. 1 and the internal conductor member is longitudinally split and provided with connecting resistances 34, as shown in Fig. 4.

I claim—

1. A lightning arrester for transmission lines comprising a tubular dielectric member, a resistance member arranged on one surface of said dielectric member in series with said transmission line and a conductor member arranged on the opposite surface of said dielectric member and forming a condenser in conjunction with said dielectric member and resistance member the conductor elements of said condenser being sufficiently separated electrically to prevent discharge therebetween for all voltages against which said arrester is designed to afford protection.

2. A lightning arrester for transmission lines comprising a tubular dielectric member, a resistance element wound on the outer surface of said dielectric member and arranged in series with said transmission line, apparatus to be protected arranged in series with said resistance element and transmission line and a conductor element within said tubular member forming a condenser with said resistance element and dielectric member, said conductor element being grounded and electrically separated from said resistance element sufficiently to prevent discharge therebetween for all voltages against which said arrester is designed to afford protection.

3. The combination with a transmission line and apparatus connected therewith of a protection device interposed in series between said line and apparatus, said protection device comprising a condenser, one element of which forms a portion of the connection between said line and apparatus and the other element of which is grounded the conductor elements of said condenser being sufficiently separated electrically to prevent discharge therebetween for all voltages against which said protection device is designed to afford protection.

4. The combination of electrical apparatus and a transmission line connected therewith of a protection device interposed in series between said line and apparatus, said protection device comprising a dielectric tube having a resistance winding upon said tube, a conductor element within said tube forming a condenser in conjunction with said tube and resistance winding, said resistance winding constituting a portion of the circuit between said line and apparatus, said resistance winding and conductor element being sufficiently separated electrically to prevent discharge therebetween for all voltages against which said protective device is designed to afford protection.

5. The combination with electrical apparatus and a conductor line of a protective device comprising a tubular dielectric member closed at one end and having a resistance winding upon the exterior thereof, means for connecting said resistance in series between said apparatus and conductor line and a conductor element within said tubular member, said element being grounded, and electrically separated beyond arcing distance from said resistance winding for all voltages against which said device is designed to afford protection.

6. The combination with electrical apparatus and a conductor line of a protection device comprising a dielectric tubular member having the walls thereof graded in thickness, a resistance winding upon said tubular member, the end of said winding adjacent to the thicker portion of said tubular member being connected with said conductor line while the opposite end of said winding is connected with said apparatus and a grounded conductor member within said tubular member.

7. The combination with electrical apparatus of a conductor, a tubular dielectric member closed at one end and open at the other, the walls of said member being thicker adjacent to said end and graded in thickness toward the open end, a resistance winding upon the exterior of said tubular member, the end of said winding adjacent to the closed end of said tubular member being connected with said conductor, while the opposite end of said winding is connected with said apparatus and a grounded conductor member within said tubular member.

8. The combination with electrical apparatus of a conductor line and a protection device, said protection device comprising a tubular dielectric member having one end thereof closed and having a projecting flange at said end, a sheet metal covering for the interior of said tubular member, said covering being grounded and a resistance winding upon the exterior of said tubular member connected in series between said apparatus and conductor line, said sheet metal covering and resistance winding being electrically separated beyond arcing distance for all voltages against which said device is designed to afford protection.

9. A protection device comprising a dielectric tubular member, a resistance winding upon the outer face of said tubular member and a split cylinder arranged within said tubular member and a resistance connected across the opening in said cylinder.

10. The combination with electrical apparatus and a transmission line of a protection device comprising a dielectric tubular member, a resistance member wound helically upon said tubular member and connected in series between said apparatus and line, a split metal cylinder arranged within said tubular member, a resistance element bridging the opening in said cylinder and a ground connection for said cylinder.

11. The combination with a transmission line and electrical apparatus connected with said line, of a protective device for said apparatus, said device comprising a condenser, one element of which is formed of a resistance conductor connected in series between said transmission line and apparatus, the complementary conductor element of said condenser being connected to ground, there being a dielectric member interposed between said resistance conductor and complementary conductor element, the capacitance of the condenser thus formed being sufficient to divert a sufficiently large proportion of all electrical disturbance, against which said protective device is designed to operate, to enable said resistance conductor to protect said apparatus against such disturbances, said resistance conductor and said complementary conductor element being separated from each other electrically beyond arcing distance for all voltages against which said device is designed to protect said apparatus.

12. The combination with a transmission line and electrical apparatus connected therewith of a resistance element connected in series between said line and apparatus for protecting said apparatus against excess current due to high frequency disturbances on said line, and means for diverting current from said resistance element to ground, said means comprising a grounded conductor spaced from said resistance element and extending along the length thereof, and a dielectric member interposed between said resistance element and grounded conductor and forming with said element and conductor a condenser, the capacitance of said condenser and the impedance of said resistance element being sufficient to divert enough of the energy of disturbances on said line to protect said apparatus from injury for all voltages against which said protecting apparatus is designed to protect said apparatus, said resistance element being sufficiently insulated from ground to prevent arcing to ground for such voltages.

13. The combination with a transmission line and electrical apparatus connected therewith, of a resistance element electrically connected in series between said line and apparatus, a conductor plate spaced from said resistance element and extending along a portion of the length thereof, and a dielectric member interposed between said conductor plate and resistance element, said dielectric member being graded in thickness and having its thicker portion adjacent the portion of said resistance element connected with said line.

14. In combination a transmission line, electrical apparatus, a resistance element electrically connected between said line and apparatus, a hollow tubular dielectric member on one surface of which said resistance element is wound, the opposite surface of said dielectric member being coated with conducting material, said conducting material being separated along an element of said tubular dielectric member forming a gap in the circumferential conductor path formed by said conductor coating, the walls of said tubular member being graded in thickness and having the thicker portion thereof adjacent the portion of said resistance element connected with said line, and a resistance bridging the gap in said conductor coating.

In testimony whereof I have signed my name to this specification on this 4th day of August A. D. 1924.

ARTHUR O. AUSTIN.